(12) United States Patent
Roberts

(10) Patent No.: US 7,613,458 B2
(45) Date of Patent: Nov. 3, 2009

(54) SYSTEM AND METHOD FOR ENABLING A RADIO NODE TO SELECTABLY FUNCTION AS A ROUTER IN A WIRELESS COMMUNICATIONS NETWORK

(75) Inventor: Robin U. Roberts, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 939 days.

(21) Appl. No.: 09/939,624

(22) Filed: Aug. 28, 2001

(65) Prior Publication Data

US 2003/0060202 A1 Mar. 27, 2003

(51) Int. Cl.
*H04W 4/00* (2006.01)
*H04W 40/00* (2006.01)
*H04L 12/28* (2006.01)
*H04L 12/56* (2006.01)

(52) U.S. Cl. .................. 455/445; 455/422.1; 370/406
(58) Field of Classification Search .............. 455/422.1, 455/445
See application file for complete search history.

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas et al. | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |

(Continued)

*Primary Examiner*—Patrick N. Edouard
*Assistant Examiner*—Matthew W Genack
(74) *Attorney, Agent, or Firm*—Randi L. Karpinia; Joseph J. Buczynski

(57) ABSTRACT

A system and method for enabling a mobile user terminal in an ad-hoc packet-switched wireless communications network to selectably operate as a router for other mobile user terminals in the network based on certain criteria. The user terminal comprises a transceiver and a controller. The transceiver is adapted to transmit wireless communications data, such as packetized data, addressed to a destination user terminal, to at least one other user terminal for routing by that other user terminal to the destination user terminal. The controller is adapted to prevent the transceiver from transmitting the wireless communications data to that particular other user terminal based on routing data pertaining to an ability of the other user terminal to route said wireless communications data to the destination user terminal. The user terminal further includes a memory for storing the routing data received from the other user terminal, for example, in the form of routing table information, or from the wireless communications network.

23 Claims, 4 Drawing Sheets

U.S. PATENT DOCUMENTS

| | | | |
|---|---|---|---|
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,304,745 B1 | 10/2001 | Mönch | |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,810,428 B1* | 10/2004 | Larsen et al. | 709/238 |
| 6,813,272 B1* | 11/2004 | An et al. | 370/395.21 |
| 6,845,091 B2* | 1/2005 | Ogier et al. | 370/338 |
| 6,934,297 B1* | 8/2005 | Bensaou et al. | 370/445 |
| 2001/0053699 A1 | 12/2001 | McCrady et al. | 455/513 |
| 2002/0071477 A1* | 6/2002 | Orava | 375/132 |
| 2002/0145978 A1* | 10/2002 | Batsell et al. | 370/238 |
| 2002/0159385 A1* | 10/2002 | Susnow et al. | 370/229 |
| 2003/0045295 A1* | 3/2003 | Stanforth | 455/445 |

* cited by examiner

SYSTEM AND METHOD FOR ENABLING A RADIO NODE TO SELECTABLY FUNCTION AS A ROUTER IN A WIRELESS COMMUNICATIONS NETWORK

BACKGROUND OF THE INVENTION

1. Field of the Invention

The present invention relates to a system and method for enabling a radio node to selectably function as a router in a wireless communications network. More particularly, the present invention relates to a system and method for enabling a mobile user terminal to selectably operate as a router for other mobile user terminals in an ad-hoc packet-switched communications network based on certain criteria.

2. Description of the Related Art

In recent years, a type of mobile communications network known as an "ad-hoc" network has been developed for use by the military. In this type of network, each user terminal is capable of operating as a base station or router for the other user terminals, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling user terminals to communicate with each other as in a conventional ad-hoc network, further enable the user terminals to access a fixed network and thus communicate with other user terminals, such as those on the public switched telephone network (PSTN), and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, the entire content of both of said patent applications being incorporated herein by reference.

Although it is advantageous in an ad-hoc network for each of the user terminals to have the capability of operating as a router, it is at times desirable for a user terminal or a particular group of user terminals to refrain from performing routing operations. For example, if a user terminal's battery or power supply begins to become exhausted, the person using the user terminal may want his or her user terminal to cease operating as a router, or to only operate as a router if no other suitable router is available, to conserve battery power.

A system and method for enabling an ad-hoc network and its user terminals to perform these battery conserving operations is described in U.S. patent application Ser. No. 09/815,164 entitled "Prioritized-Routing for an Ad-Hoc, Peer-to-Peer, Mobile Radio Access System", filed on Mar. 22, 2001, the entire content of which is incorporated herein by reference. As described in this patent application, a user terminal can broadcast to other user terminals routing table information that includes information pertaining to the condition of a battery of that user terminal. That is, the routing table information can indicate whether the battery of the user terminal has infinite life (i.e., the user terminal is connected to a constant power supply), excellent battery life (i.e., the user terminal's battery is essentially fully charged), poor battery life (i.e., the charge in the user terminal's battery is becoming low), or no battery life (i.e., the charge in the user terminal's battery is almost depleted). When a user terminal broadcasts its routing table to the other user terminals within its radio frequency (RF) range, each of those other user terminals store all or a relevant portion of this routing table information in their respective memory. Hence, the respective controllers in the user terminals can determine whether to route packetized data to a particular user terminal based on, for example, the condition of the battery of that particular user terminal, among other things.

For example, if a user terminal (source user terminal) wishes to communicate with another user terminal (destination user terminal) in the ad-hoc network, the controller of the source user terminal can determine, based on the routing table information stored in its memory, whether to send data packets to a particular neighboring user terminal for routing to the destination user terminal. If the routing table information indicates that the battery of that neighboring user terminal has an acceptable life rating (e.g., infinite or excellent life), then the controller of source user terminal can control the source user terminal's transceiver to send data packets addressed for destination user terminal to that neighboring user terminal over the appropriate data channel as can be appreciated by one skilled in the art. The transceiver of the neighboring user terminal can then operate as a router to route those data packets either directly to the destination user terminal if the destination user terminal is in the neighboring user terminals RF range, or to another neighboring user terminal in a manner similar to that described above.

However, when the controller of the source user terminal determines from the routing table information that the battery of a particular neighboring user terminal has poor life or no life, the controller of the source user terminal will control the source user terminal's transceiver to refrain from sending any such data packets to that particular neighboring user terminal. The controller will thus examine the routing table information to seek another route by which to send data packets to the destination user terminal. That is, the controller of the source user terminal can examine the routing table information stored in the source user terminal's memory which pertains to other neighboring user terminals to determine whether any of those neighboring user terminals can be used as routers to route the data packets to the destination user terminal. The controller can take into account such factors as the battery lives of the neighboring user terminals, as well as the expected quality of service (QOS) levels that can be attained, and so on. The source user terminal's controller can also determine whether a particular neighboring user terminal is incapable of acting as a router due to, for example, poor battery life, inaccessibility due to an obstacle blocking the line of sight (LOS) between the source and neighboring user terminal, or malfunction of the neighboring user terminal. As can be appreciated by one skilled in the art, this ability is referred to as the "self-healing" characteristics of an ad-hoc network as described, for example, in U.S. Pat. No. 5,943,322 to Mayor and in U.S. patent application Ser. Nos. 09/897,790, 09/815,157 and 09/815,164, referenced above.

In addition to enabling a user terminal to avoid or minimize its routing operations for battery conservation purposes, it may be desirable to disable the routing capability of individual user terminals or groups of user terminals for other reasons. Accordingly, a need exists for a more enhanced system and method for enabling user terminals to selectably operate as a router in an ad-hoc network.

SUMMARY OF THE INVENTION

An object of the present invention is to provide a system and method for enabling a mobile user terminal in an ad-hoc packet-switched wireless communications network to selectably operate as a router for other mobile user terminals in the network based on certain criteria.

Another object of the present invention is to provide a system and method which enables an ad-hoc packet-switched wireless communications network to selectably control user terminals in the network to operate as routers for other user terminals in the network based on criteria pertaining to individual user terminals or groups of user terminals.

These and other objects are substantially achieved by providing a communications network, in particular, an ad-hoc packet-switched communications network, having user terminals which are capable of selectably operating as routers to route data packets addressed for other user terminals in the network. A user terminal comprises a transceiver and a controller. The transceiver is adapted to transmit wireless communications data, such as packetized data, addressed to a destination user terminal, to at least one other user terminal for routing by that other user terminal to the destination user terminal. The controller is adapted to prevent the transceiver from transmitting the wireless communications data to that particular other user terminal based on routing data pertaining to an ability of the other user terminal to route said wireless communications data to the destination user terminal. The user terminal further includes a memory for storing the routing data received from the other user terminal, for example, in the form of routing table data, or from the wireless communications network. The routing table data can indicate that the other user terminal is not operating to route any wireless communications data to the destination user terminal, and can further indicate that the other user terminal is among a group of user terminals having a particular characteristic. However, the controller is further adapted to control the transceiver to transmit to that other user terminal wireless communications data that is addressed for end use by that other user terminal.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
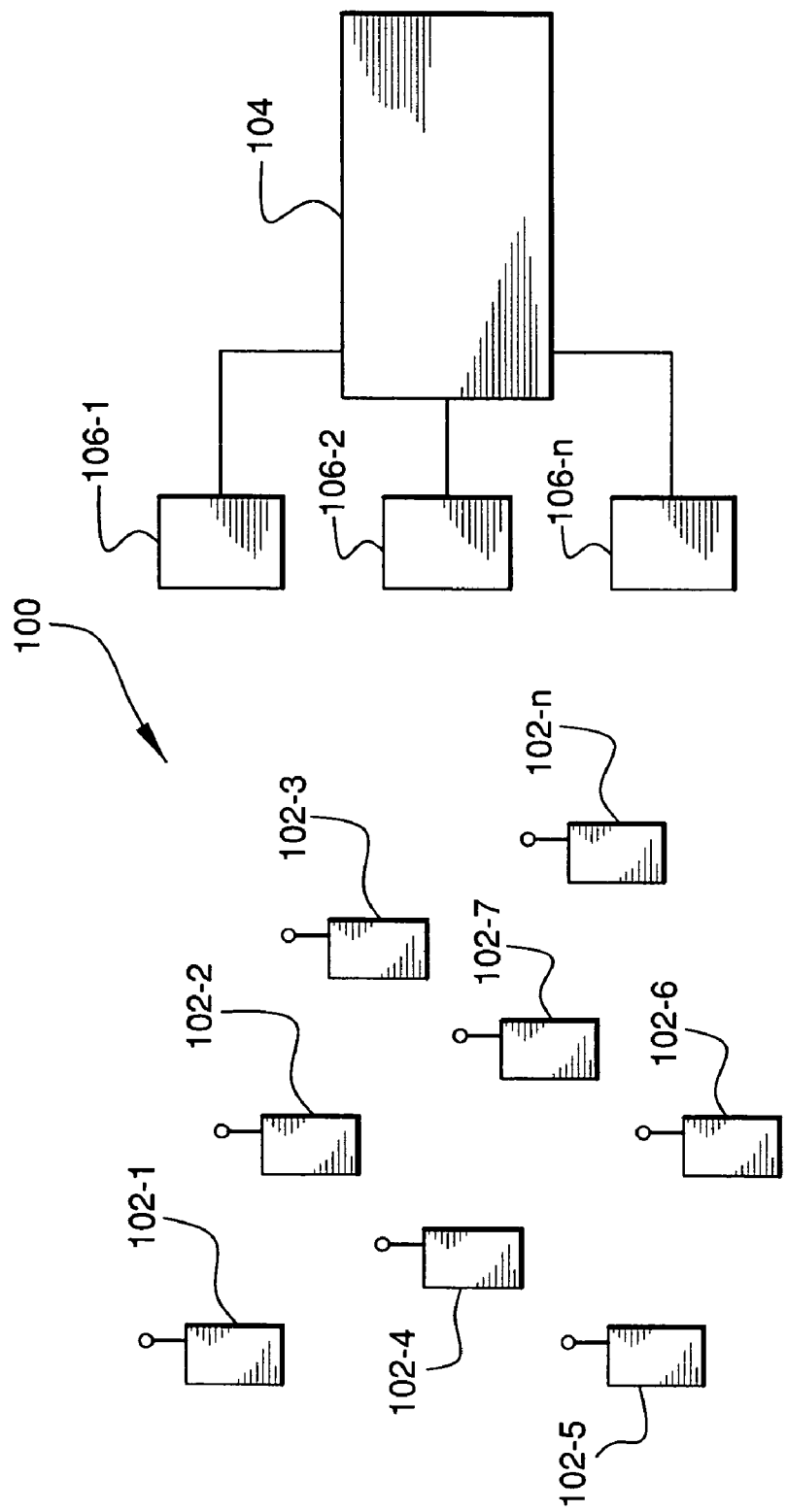
FIG. 1 is a block diagram of an example of an ad-hoc packet-switched wireless communications network employing a system and method for selectably controlling user terminals in the network to operate as routers for other user terminals in the network based on criteria pertaining to individual user terminals or groups of user terminals according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as user terminals 102), and a fixed network 104 having a plurality of access points 106-1, 106-2, . . . , 106-n, for providing the user terminals 102 with access to the fixed network 104. The fixed network 104 includes, for example, a core local access network (LAN), and a plurality of servers and gateway routers, to thus provide the user terminals 102 with access to other networks, such as the public switched telephone network (PSTN) and the Internet.

Figure 2:
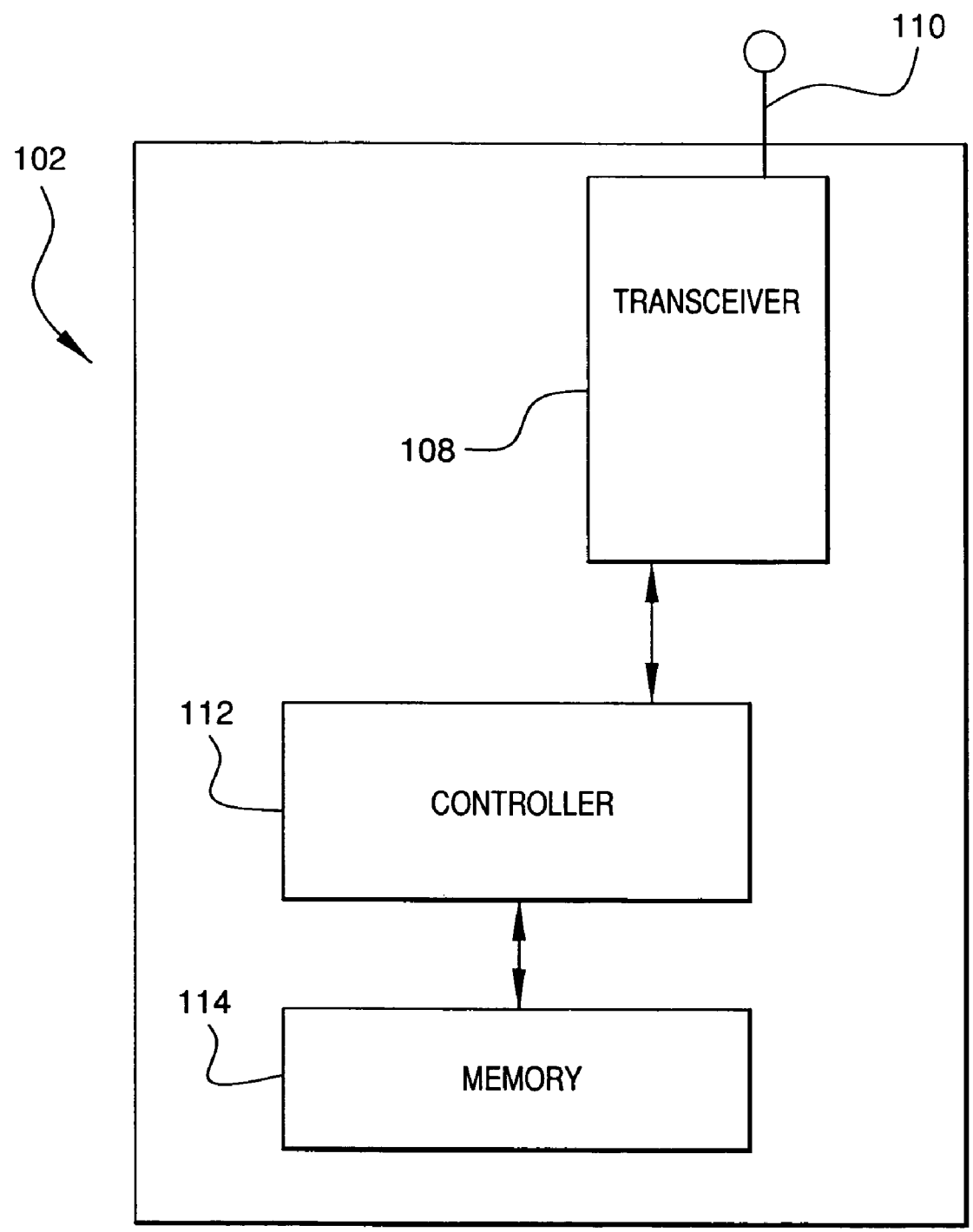
FIG. 2 is a block diagram illustrating an example of a user terminal employed in the network shown in FIG. 1.

As can be appreciated by one skilled in the art, the user terminals 102 are capable of communicating with each other directly, or via one or more other user terminals 102 operating as a router or routers for data packets being sent between user terminals 102, as described in U.S. Pat. No. 5,943,322 to Mayor and in U.S. patent application Ser. Nos. 09/897,790 and 09/815,157, referenced above. Specifically, as shown in FIG. 2, each user terminal 102 includes a transceiver 108 which is coupled to an antenna 110 and is capable of receiving and transmitting signals, such as packetized data signals, to and from the user terminal 102, under the control of a controller 112. The packetized data signals can include, for example, voice, data or multimedia.

Each user terminal 102 further includes a memory 114, such as a random access memory (RAM), that is capable of storing, among other things, routing information pertaining to itself and other user terminals 102 in the network 100. The user terminals 102 exchange their respective routing information, referred to as routing advertisements or routing table information, with each other via a broadcasting mechanism periodically, for example, when a new user terminal 102 enters the network 100, or when existing user terminals 102 in the network 100 move. A user terminal 102 will broadcast its routing table updates, and nearby user terminals 102 will only receive the broadcast routing table updates if within radio frequency (RF) range of the broadcasting user terminal 102. For example, assuming that user terminals 102-1, 102-3 and 102-4 are within the RF broadcast range of user terminal 102-2, when user terminal 102-2 broadcasts its routing table information, that information is received by user terminals 102-1, 102-3 and 102-4. However, if user terminals 102-5, 102-6 and 102-7 through 102-n are out of the broadcast range, none of those user terminals will receive the broadcast routing table information from user terminal 102-2.

Each of the user terminals 102-1, 102-3 and 102-4 that receive the routing table information from user terminal 102-2 can store all or a relevant portion of that routing table information in their respective memory 114. Typically, each user terminal 102 will perform a pruning operation to reduce the amount of routing table information that it stores in its memory 114 as can be appreciated by one skilled in the art. It is also noted that when a user terminal 102 broadcasts the routing table information to its neighboring user terminals 102, the user terminal 102 can include routing table information pertaining to some or all of its neighboring user terminals 102 that it has previously received from them and has stored in its memory 108. Accordingly, a user terminal 102 receiving the broadcast routing table information from another user terminal 102 also receives some information pertaining to the routing capabilities of the neighbors of that other user terminal 102.

An example of the manner in which user terminals 102 can communicate data packets to each other will now be described. Referring to FIG. 1, if user terminal 102-1 wishes to communicate with user terminal 102-7 in the ad-hoc network, the controller 112 of user terminal 102-1 can determine, based on the routing table information stored in memory 114 of user terminal 102-1, whether to send data packets along a particular path to user terminal 102-7. For example, if the controller 112 of user terminal 102-1 determines that the path including user terminal 102-2 is acceptable, then the controller 112 of user terminal 102-1 controls the transceiver 108 of user terminal 102-1 to send the data packets addressed for user terminal 102-7 to user terminal 102-2 over an appropriate channel as can be appreciated by one skilled in the art. Using similar decision making operations, the controller 112 of user terminal 102-2 can control the transceiver 108 of user terminal 102-2 to send the data packets to, for example, user terminal 102-3, whose transceiver 108 in turn is controlled by its respective controller 112 to send the data packets to the destination user terminal 102-7.

Accordingly, any user terminal 102 operating in a certain region of the network 100 can generally use any other user terminal 102 within that region as a router to route data packets to a destination user terminal 102. Moreover, the access points 106 can also operate as routers to route data packets between user terminals 102. For example, user terminal 102-3 can use access point 106-2 to route data packets to a destination user terminal 102-7 if necessary or desirable.

Although each user terminal 102 is capable of operating as a router, there are reasons why it may be desirable for certain user terminals not to act as routers in the network 100. For example, the network operator may choose to only utilize network infrastructure components for routing. This can ensure that user traffic is always routed through the network radio nodes, such as the access points 106, to allow metering or monitoring of the traffic. This can also enhance end-user packet security by never having packets route through another end-user device.

Also, a user or group of users may desire that their user terminals 102 not be used for routing. For example, it may be desirable to ensure that maximum throughput is available in a group by never having to relay data packets of user terminals 102 outside of the group. It also may be desirable to conserve the lives of the batteries of the user terminals 102 of a particular group by not using those user terminal's battery power for routing data packets.

In addition, a closed user group can be defined which only allows routing among members of the group. This can be used to define private networks within a larger common service area.

Furthermore, a hierarchical class of users can be defined which enables and restricts use of other classes of devices for routing. For example, public safety users can use all available radio nodes (e.g., mobile user terminals 102 and access points 106) for routing, but the general population of users cannot route through those user terminals 102 or access points 106 which are acting as public safety nodes. Hence, the network 100 can provide for overload control in times of emergency, in which event public safety user terminals 102 can use specifically designated infrastructure equipment for routing, but the general population of user terminals 102 cannot.

Figure 3:
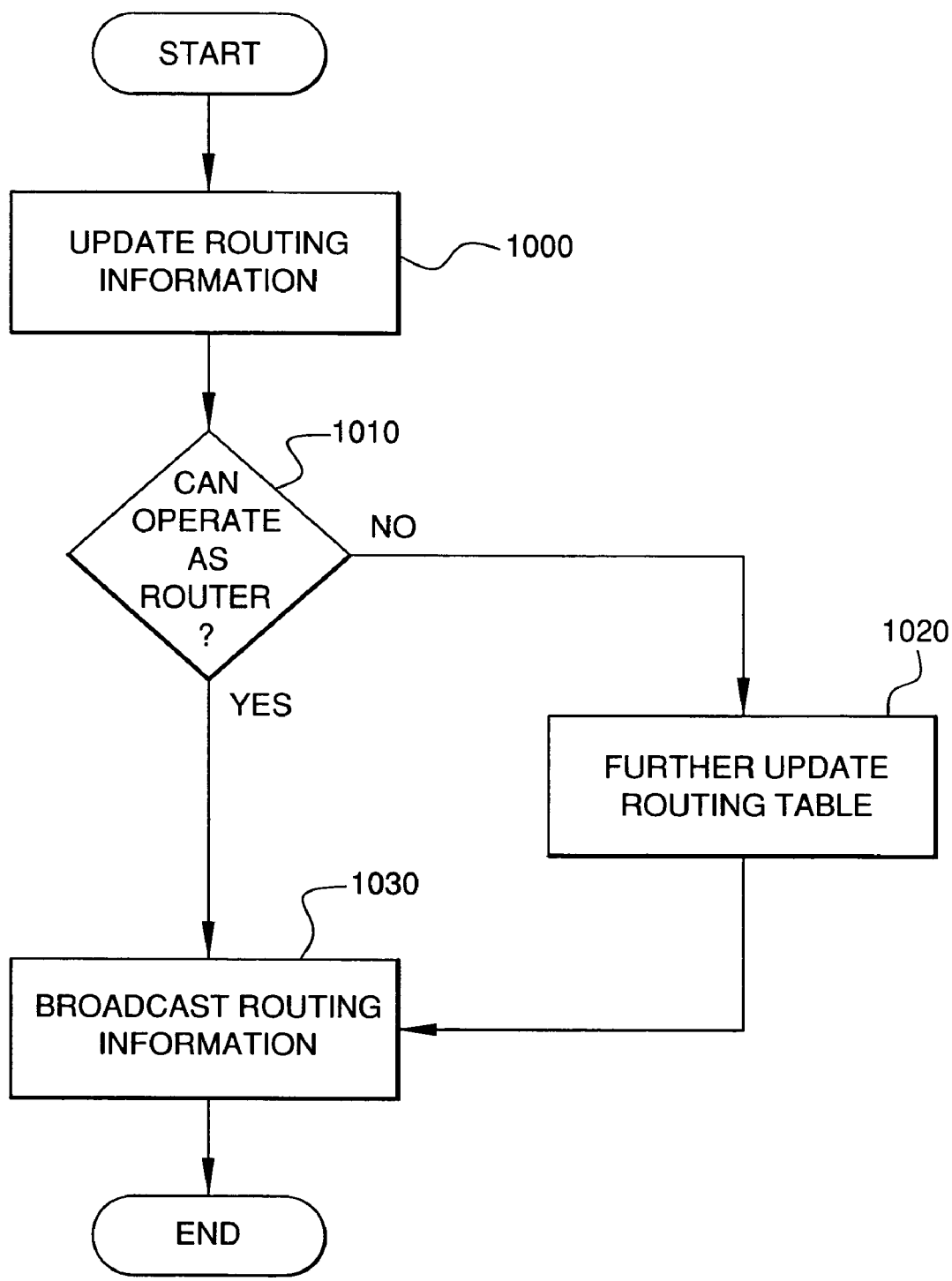
FIG. 3 is a flowchart showing an example of operations performed by a user terminal to update its routing table information according to an embodiment of the present invention.
Figure 4:
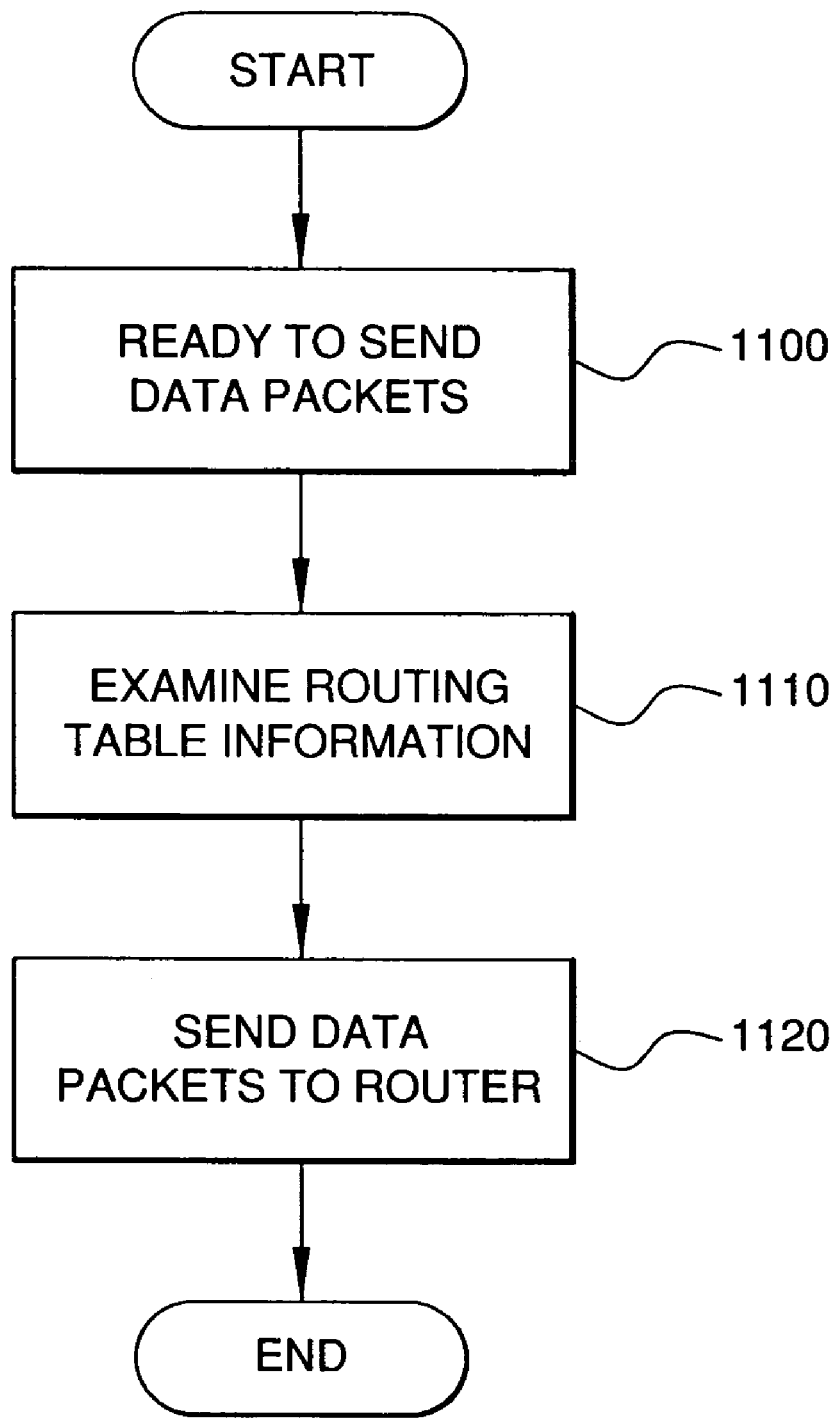
FIG. 4 is a flowchart showing an example of operations performed by a user terminal to select a route via which to send data packets destined for another user terminal according to an embodiment of the present invention.

An example of the manner in which a user terminal 102 can be selected to operate as a router, or to refrain from operating as a router, according to an embodiment of the present invention will now be described with reference to FIGS. 1 and 2 and the flowcharts shown in FIGS. 3 and 4. As shown in FIG. 3, when a user terminal 102 is turned on, or when a periodic routing table information update occurs, the controller 112 of the user terminal 102 updates the routing table of the user terminal 102 in step 1000 as appropriate to include information pertaining to the ability of a user terminal 102 to operate as a router. As discussed above, this information can include, among other things, information pertaining to the state of the battery of the user terminal 102. During this routing table process, the controller 112 determines in step 1010 whether or not its user terminal 102 is to be permitted to operate as a router.

For example, a person using the user terminal 102 may enter a code on the keypad (not shown) of the user terminal 102 which indicates to the controller 112 that the user terminal 102 is not to be permitted to operate as a router. Alternatively, for reasons discussed above, the network operator may send a command to the user terminal 102 via, for example, an access point 106 with which the user terminal 102 is affiliated, to disable the ability of the user terminal 102 to operate as a router. If the controller 112 determines in step 1010 that the user terminal 102 should not be permitted to operate as a router, then the controller 112 further updates the routing table of the user terminal 102 to this effect in step 1020.

The processing then proceeds to step 1030, where the controller 112 of the user terminal 102 controls the transceiver 108 of the user terminal 102 to broadcast the user terminal's routing table information to its neighboring nodes, that is, the other user terminals 102 and access points 106 in the network 100 that are within the RF range of the user terminal 102. However, if the controller 112 determines in step 1010 that the user terminal 102 is permitted to operate as a router, the processing proceeds directly from step 1010 to step 1030 where the routing table information is broadcast to the neighboring user terminals 102 and access points 106 within the RF broadcast range.

The operations described above are then repeated periodically, or whenever the status of a user terminal 102 changes from a user terminal capable of acting as a router to a user terminal not permitted to act as a router, and the routing table of the user terminal 102 is thus updated.

The manner in which a user terminal 102 attempting to send data packets to another user terminal 102 considers the routing and non-routing capabilities of other user terminals 102 will now be described with reference to the flowchart in FIG. 4. When user terminal 102-1, for example, attempts to send data packets to another user terminal, such as user terminal 102-7, in step 1100, the controller 112 in user terminal 102-1 will examine the routing table information in the memory 108 of the user terminal 102-1 to determine the routing path via which the packets should be routed in step 1110 as described, for example, in U.S. patent application Ser. Nos. 09/897,790, 09/815,157 and 09/815,164, referenced above.

If the controller 112 of user terminal 102-1 determines in step 1110 that any user terminal 102 along one of the possible routing paths has been set to not operate as a router, the controller 112 determines that that path is not available. The controller 112 in step 1120 will thus control the transceiver 108 of user terminal 102-1 to send the data packets to a user terminal 102 along a path that is available. For example, referring to FIG. 1, if the routing table information pertaining to user terminal 102-2 indicates that it is not to operate as router for any of the reasons discussed above (e.g., it is within a closed group of nodes, public safety nodes, or any other criteria), then user terminal 102-1 will not send any data packets intended for user terminal 102-7 to user terminal 102-2. However, if the controller 112 of user terminal 102-1 determines from its stored routing table information that user terminal 102-4 is available to act as a router, the controller 112 of user terminal 102-1 can control the transceiver 108 of user terminal 102-1 to send data packets to user terminal 102-4. The user terminal 102-4 will then perform a similar examination of the routing table information stored in its memory to determine whether to send the data packets to, for example, user terminal 102-5 or user terminal 102-6, or to an access point (e.g., access point 106-2), for ultimate delivery to user terminal 102-7.

It is noted that if user terminal 102-1 examines its routing table information and finds that no neighboring user terminals 102 are available or capable of acting as a router, the user terminal 102-1 can attempt to send the data packets addressed to user terminal 102-7 to an access point (e.g., access point 106-1) with which user terminal 102-1 is affiliated. However, if the access point is out of RF range and no neighboring user terminal are available or operating as a router, then user terminal 102-1 will not be able to send the data packets.

Furthermore, the controller 112 of user terminal 102-1 can also control the transceiver 108 of user terminal 102-1 to prevent the transceiver 108 from sending data packets addressed for user terminal 102-7 to certain user terminals (e.g., user terminal 102-2), based on certain criteria local to user terminal 102-1, as well as information in the routing table information provided to user terminal 102-1 by user terminal 102-2, or a combination of such criteria or other criteria. For example, a controller 112 of user terminal 102-1 can be configured to favor line-powered routers, such as access points 106 or user terminals 102 plugged into charging devices, over battery-powered user terminals 102 for data packet routing. The controller 112 can also favor devices with higher remaining battery life, as well as routes that cause the least interference and routes that use the least overall energy, to name a few. In addition, the controller 112 can favor higher-performance devices, such as user terminals 102 or access points 106 having higher power transceivers 108 or higher speed controllers 112, over lower-performance devices to minimize the impact that the routing decision may have on the end-user.

The controller 112 can also be configured to limit the number of packets routed through a particular user terminal 102 within a given time period. In addition, to encourage subscribers to allow their user terminals 102 to act as routers, the network operator can give credits, such as billing credits or other priority credits, to a user terminal 102 subscriber for allowing his or her user terminal to operate as a router. The network operator may wish to limit the number of credits given based on any desired criteria.

It is also noted the user terminal 102-1 will not refrain from sending to user terminal 102-2 data packets addressed to user terminal 102-2, and will likewise not refrain from sending to user terminal 102-4 data packets addressed to user terminal 102-4. That is, the information in a user terminal's routing table does not prevent that user terminal from receiving data packets that are addressed to that user terminal.

The controller 112 of user terminal 102-1 can repeat the above processes while transmitting data packets to the user terminal 102-7 via the selected route. As discussed above, if a user terminal 102 changes its status from a routing-capable user terminal to a non-routing capable user terminal, the controller 112 of user terminal 102-1 will take into account this information in step 1110 when making the next routing decision after having received a routing table update.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An adhoc multi-hopping wireless communications network comprising:
    a plurality of nodes communicatively coupled within the adhoc wireless communication network, wherein each of the plurality of nodes is capable of operating in an operational state comprising one of:
    an off state,
    an active and relay state, wherein in the active and relay state, a node receives data packets addressed to the node and transmits data packets sourced by the node, and further wherein the node receives and transmits a relay of data packets addressed to at least one other node, and
    an active and non-relay state, wherein in the active and non-relay state a node receives data packets addressed to the node and transmits packets sourced by the node, and further wherein the node does not relay data packets address to any other node,
    wherein each of the plurality of nodes further operates to receive one or more economic credits for relaying one or more packets,
    wherein each of the plurality of nodes includes an associated current number of economic credits and an associated maximum number of economic credits, and
    further wherein the operational state of a node is set to an active and non-relay state when the associated current number of credits is at least equal to the maximum number of economic credits.

2. An adhoc multi-hopping wireless communications network as claimed in claim 1,
    wherein the plurality of nodes comprise one or more categories of nodes, wherein each category of node defines the operational state for each node within the category, and
    further wherein, the operational state of each of the plurality of nodes can be dynamically determined by one or more immediate neighbor nodes during route establishment dependent upon the category of the originating node.

3. An adhoc multi-hopping wireless communications network as claimed in claim 1, wherein each of the plurality of nodes comprises a mechanism for receiving one or more user configuration information, and further wherein the operational state of each of the plurality of nodes is further determined using the user configuration information.

4. An adhoc multi-hopping wireless communications network as claimed in claim 1, wherein each of the plurality of nodes comprises a mechanism for receiving one or more network configuration information, and further wherein the operational state of each of the plurality of nodes is further determined using the network configuration information.

5. An adhoc multi-hopping wireless communications network as claimed in claim 1, wherein each of the plurality of nodes operates to inform one or more other immediate neighbor nodes of the operational state.

6. An adhoc multi-hopping wireless communications network as claimed in claim 5, wherein each of the plurality of nodes further operates to inform the one or more other immediate neighbor nodes of a change in the operational state.

7. An adhoc multi-hopping wireless communications network as claimed in claim 1, wherein each of the plurality of nodes further operates to provide configuration information to one or more other immediate nodes for use in the one or more immediate nodes determining the operational state of the node.

8. An adhoc multi-hopping wireless communications network as claimed in claim 1, wherein the plurality of nodes comprise one or more categories of nodes, wherein each category of node defines the operational state for each node within the category, and wherein the category of at least one of the plurality of nodes comprises a non-network infrastructure component category, and further wherein the operational state is set to an active and non-relay state for each of the plurality of nodes of the non-network infrastructure component category.

9. An adhoc multi-hopping wireless communications network as claimed in claim 1, wherein the plurality of nodes comprise one or more categories of nodes, wherein each category of node defines the operational state for each node within the category, and wherein an immediate neighbor node is a group member of a closed user group, and further wherein the originating node comprises a non-group member of the closed user group, and further wherein the operational state of the immediate neighbor node is set to an active and non-relay state in response to the category of the originating node comprising a non-group member of the closed user group.

10. An adhoc multi-hopping wireless communications network as claimed in claim 1, wherein each of the plurality of nodes has an associated node class, and further wherein the operational state of each immediate neighbor node of an originating node is determined by the relationship between the originating node's associated class and the immediate neighbor node's associated class.

11. An adhoc multi-hopping wireless communication network as claimed in claim 10, wherein the operational state of the immediate neighbor node is set to an active and relay state when the immediate neighbor node's associated class comprises a class selected from a class group comprising a line powered device, a high remaining battery life device, a least interference device, a least energy device, and a high performance device.

12. An adhoc multi-hopping wireless communication network as claimed in claim 10, wherein the operational state of the immediate neighbor node is set to an active and non-relay state when the immediate neighbor node's associated class comprises a class selected from a class group comprising a battery powered device, a low remaining battery life device, a high interference device, a high energy device, and a low performance device.

13. An adhoc multi-hopping wireless communications network as claimed in claim 2, wherein each of the one or more immediate neighbor nodes comprises a neighbor table stored in a memory for use in determining the operational state of the plurality of nodes.

14. An adhoc multi-hopping wireless communications network comprising:

a plurality of nodes communicatively coupled within the adhoc wireless communication network, wherein each of the plurality of nodes is capable of operating in an operational state comprising one of:
  an off state,
  an active and relay state, wherein in the active and relay state, a node receives data packets addressed to the node and transmits data packets sourced by the node, and further wherein the node receives and transmits a relay of data packets addressed to at least one other node, and
  an active and non-relay state, wherein in the active and non-relay state a node receives data packets addressed to the node and transmits packets sourced by the node, and further wherein the node does not relay data packets address to any other node, wherein each of the plurality of nodes further operates to receive one or more economic credits for relaying one or more packets, and wherein each of the plurality of nodes includes an associated current number of economic credits and an associated maximum number of economic credits, and further wherein the operational state of a node is set to an active and non-relay state when the associated current number of credits is at least equal to the maximum number of economic credits.

15. An adhoc multi-hopping wireless communications network as claimed in claim 14, wherein each of the plurality of nodes operates to:
  determine its operational state, and
  inform one or more immediate neighbor nodes of the operational state.

16. An adhoc multi-hopping wireless communications network as claimed in claim 14, wherein each of the plurality of nodes further operates to inform the one or more immediate neighbor nodes of a change in the operational state.

17. An adhoc multi-hopping wireless communications network as claimed in claim 14, wherein each of the plurality of nodes comprises a mechanism for receiving one or more network configuration information, and further wherein the operational state of each of the plurality of nodes is further determined using the network configuration information.

18. An adhoc multi-hopping wireless communications network as claimed in claim 14, wherein each of the plurality of nodes comprises a mechanism for receiving one or more user configuration information, and further wherein the operational state of each of the plurality of nodes is further determined using the user configuration information.

19. An adhoc multi-hopping wireless communications network as claimed in claim 14, wherein the plurality of nodes comprise one or more categories of nodes, wherein each category of node defines the operational state for each node within the category, and wherein the category of at least one of the plurality of nodes comprises a non-network infrastructure component category, and further wherein the operational state is set to an active and non-relay state for each of the plurality of nodes of the non-network infrastructure component category.

20. An adhoc multi-hopping wireless communications network as claimed in claim 14, wherein the plurality of nodes comprise one or more categories of nodes, wherein each category of node defines the operational state for each node within the category, wherein at least one of the plurality of nodes is a group member of a closed user group, and further wherein a packet originating node comprises a non-group member of the closed user group, and further wherein the operational state of the at least one of the plurality of nodes is set to an active and non-relay state in response to the category of the packet originating node comprising a non-group member of the closed user group.

21. An adhoc multi-hopping wireless communications network as claimed in claim 14, wherein at least one of the plurality of nodes has an associated node class, and further wherein the operational state of each of the at least one of the plurality of nodes is determined by the relationship between a packet originating node's associated class and the at least one of the plurality of node's associated class.

22. An adhoc multi-hopping wireless communication network as claimed in claim 21, wherein the operational state of the at least one of the plurality of nodes is set to an active and relay state when the at least one of the plurality of nodes' associated class comprises a class selected from a class group comprising a line powered device, a high remaining battery life device, a least interference device, a least energy device, and a high performance device.

23. An adhoc multi-hopping wireless communication network as claimed in claim 21, wherein the operational state of the at least one of the plurality of nodes is set to an active and non-relay state when the at least one of the plurality of nodes' associated class comprises a class selected from a class group comprising a battery powered device, a low remaining battery life device, a high interference device, a high energy device, and a low performance device.

* * * * *

UNITED STATES PATENT AND TRADEMARK OFFICE
CERTIFICATE OF CORRECTION

| | | |
|---|---|---|
| PATENT NO. | : 7,613,458 B2 | Page 1 of 1 |
| APPLICATION NO. | : 09/939624 | |
| DATED | : November 3, 2009 | |
| INVENTOR(S) | : Roberts | |

It is certified that error appears in the above-identified patent and that said Letters Patent is hereby corrected as shown below:

ON THE TITLE PAGE

1. On Page 2, in item (56), under "U.S. PATENT DOCUMENTS", in Column 1, Line 41, after "Haugli et al." insert -- 370/311 --.

Signed and Sealed this

Fifth Day of October, 2010

David J. Kappos
*Director of the United States Patent and Trademark Office*